Oct. 15, 1963  F. NESH  3,106,836
DETERMINATION OF TRACE AMOUNTS OF WATER IN OTHER FLUIDS
Filed Sept. 15, 1959
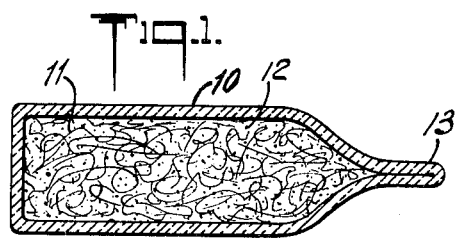
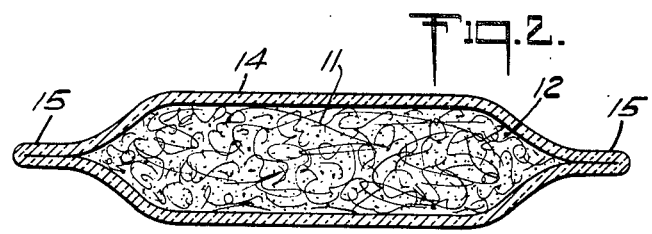
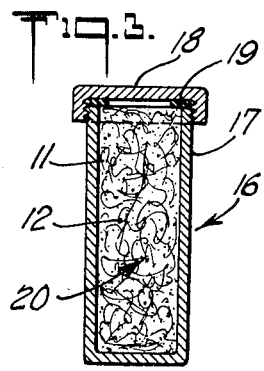
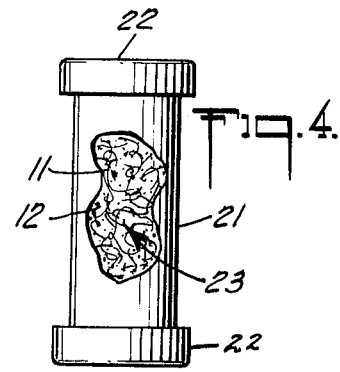
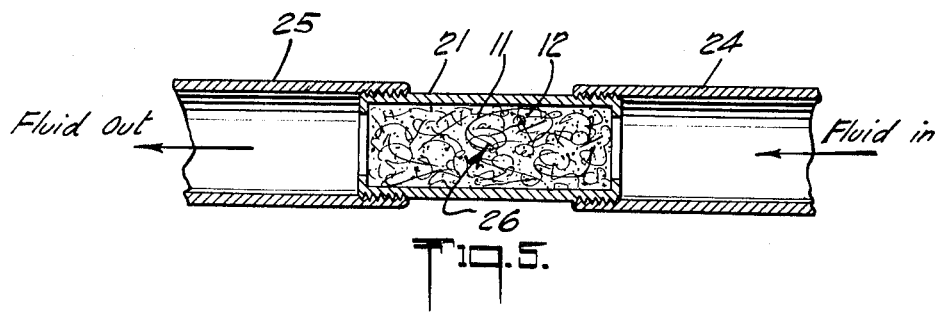
INVENTOR.
FLORENCE NESH
BY
ATTORNEYS.

United States Patent Office 3,106,836
Patented Oct. 15, 1963

3,106,836
DETERMINATION OF TRACE AMOUNTS OF WATER IN OTHER FLUIDS
Florence Nesh, 164 Hart St., Brooklyn 6, N.Y.
Filed Sept. 15, 1959, Ser. No. 840,207
13 Claims. (Cl. 73—53)
(Granted under Title 35, U.S. Code (1952), sec. 266)

The invention described herein may be manufactured and used by or for the Government of the United States of America for governmental purposes without the payment of any royalties thereon or therefor.

This invention relates to the determination of the presence of trace amounts of water in other fluids, where drying methods are not practical or cannot be used. Heretofore such determination has involved the use of long procedures and complicated and unwieldy apparatus, and technically trained personnel was required to make such determinations. In my copending application, Serial No. 611,796, filed September 24, 1956, now Patent No. 2,950,958, a new procedure was disclosed for making such determinations in a simple and practical manner, and this invention is in the nature of a specific employment of the basic procedure disclosed in such copending application, and in the provisions and use of a simple field kit for following such basic procedure. There has been an increasing need for a simple, compact and inexpensive field or laboratory kit for the determination of the presence of traces of water in other fluids, particularly in jet fuels.

An object of this invention is to provide a sensitive, simple, practical and inexpensive method and device for the quick, reliable, and rapid determination of the presence of even minute traces of water in fluids, both gaseous and liquid, which may be employed in either the field or laboratory, even by non-technically educated personnel, and which may be used to give an approximate estimate of the proportion of water present in the fluids under examination.

Another object is to provide a relatively simple, compact, practical, reliable, convenient and inexpensive device for use in determining the presence of even minute traces of water in a fluid under examination, and which will retain its potential usefulness indefinitely in different climates and atmospheric conditions.

Other objects and advantages will appear from the following description of some examples of the invention, and the novel features will be particularly pointed out hereinafter in connection with the appended claims.

In the accompanying drawing:

FIG. 1 is a sectional elevation of a testing kit or device representing one example of the invention;

FIG. 2 is a similar elevation of a modified device representing another example of the invention;

FIG. 3 is a sectional elevation of another type of device made in accordance with this invention;

FIG. 4 is a front elevation of another example of the invention, where the envelope is open at both ends, and FIG. 5 is a sectional elevation of the device shown in FIG. 4, as it may be incorporated in apparatus according to this invention.

Referring first to FIG. 1, a closed and sealed impervious, hollow envelope, capsule, ampule, vial or casing 10 has therein a penetrable mesh 11, such as may be formed of a compacted mass of extruded inert fibers in which is entrained, entrapped or confined a diluent quantity of inert, loose, solid particles 12 of small size and having mixed therein an anhydrous color agent that changes color materially upon contact with water but which undergoes no such color change in a fluid that has no released water. To this mixture is added a small amount of an anhydrous, emulsion breaking material that breaks up any emulsion in a fluid under test, that may hold water confined therein as an emulsion or dispersion. This emulsion-breaking material may be added to the contents of the envelope 10 before it is sealed or closed, or a few drops of it added to the contents after the envelope is opened in preparation for use.

The envelope 10 may be formed of any suitable and inexpensive material, such as the gelatines of which medical capsules are formed, or of glass or plastics, that are closed and sealed after the contents have been inserted. Glass is particularly useful and inexpensive for the material of the envelope because it is easily formed into the desired shape and size while being heated, and after filling with the mesh and other contents, it can easily be sealed by heat fusing applied to the projecting neck 13 of the envelope. The mesh may, for example, be a quantity of glass or mineral wool compacted or pushed together and inserted into the envelope.

The inert solid particles trapped or confined in the mesh may be anhydrous talc or clay, or any other loose solid particles that are inert and insoluble in water and in the fluid to be examined, if such fluid is a liquid, and serves as an inert diluent or filler for the anhydrous color agent. The color agent is any one that undergoes a material change in color when in contact with water, and which is soluble in or has a high sensitivity to water, but which does not chemically react with either the fluid under examination or the emulsion-breaking material. An excellent color agent for this purpose is known as methylene blue which in its dry or anhydrous state is a brown colored powder that is very soluble in water and changes its color to a distinctive deep blue color when dissolved in water. Another color agent is a dye known as Chlorazol Fast Blue FFS which normally has a pale grey color, but which changes to a deep blue in contact with water. It is insoluble in fuel and lubricating oils but soluble in water. Examples of other water soluble dyes that may be used in place of methylene blue are the water soluble azo dyes, and although they are water soluble, they are insoluble in the fuels or liquids under test. These dyes are powders and when dissolved in water in the fluid under examination they will color the water and thereby visibly indicate the presence of such water. Examples of such dyes are disclosed, for example, in "The Chemistry of Synthetic Dyes" volume 1, pages 409 to 649, inclusive by K. Venkataraman, published in 1952 by Academic Press, Inc. of New York City, to which reference may be had for a long list of suitable dyes that can be used in place of methylene blue. The latter, however, is inexpensive and readily available, and its true blue color when dissolved in water makes it a very effective and easily observed water indicator.

The emulsion breaking material is one which is usually a solvent for the fluid, if the fluid is a liquid, and which is water free and does not react chemically with the color indicator. A very practical, inexpensive and successful material for this purpose is carbon tetrachloride, but examples of other convenient emulsion breaking materials are acetone and benzol.

Water in fuels and many other materials is often held in such material as an emulsion or dispersion so that it is not released water so that it can collect in visible globules, and does not always dissolve enough of the water soluble color agent such as methylene blue to be readily visible. Hence such a color agent alone does not always indicate the presence of minute traces of water. The emulsion-breaking material such as a solvent for the fuel or fluid under examination, breaks up the emulsion or dispersion holding the minute traces of water restrained, and releases or frees the so held water, which minute released or freed water then collects or coagulates in small globules and dissolves any of the color agent with which it then contacts, thus showing small blue colored globules in the fluid under examination, thereby indicating the presence of water in the fluid under examination.

In the example of the invention shown in FIG. 1, when an examination is to be made of a liquid, such as a jet or other hydrocarbon fuel, for example, the neck 13 is broken off to open the envelope, and then the opened envelope is dipped, or placed in, or filled with the fuel or fluid under examination. If the envelope did not contain any carbon tetrachloride or other emulsion breaking material before it was closed and sealed, some of the carbon tetrachloride or other emulsion-breaking material is added to the test specimen or to the interior of the envelope 10 before it is filled with, or placed in, the fuel. If the fluid under examination is a gas, the opened envelope is place in a confined quantity of the gas and allowed to stand for a period of time sufficient to permit entrance of the gas into and exit from the opened envelope, so that any free or released water vapor in the gas can combine with the color agent and cause a change in the color of such agent, thereby indicating the presence of water in said gas.

In the example illustrated in FIG. 2, the envelope 14 is similar to that disclosed in FIG. 1 except that it has a neck 15 at each end thereof, so that when both necks are cut to open both ends of the envelope, the passage of fluid to be examined into or through the chamber of the envelope will be facilitated. This envelope has the same water detecting contents as explained for the envelope 10 of FIG. 1, and are similarly designated in FIG. 2 also.

In the example illustrated in FIG. 3, the envelope 16 may have a casing 17 of any suitable, impervious material that is closed except at one end where a cap 18 is removably attached to and completely closes this envelope. An annular or endless gasket 19 may be employed in the cap to engage with the open end of the casing 17 and form a seal for the cap as the cap is tightened on the casing. The cap may be threaded to the open end of the casing or otherwise detachably fastened thereon. This casing is filled with contents 20 similar to those disclosed in connection with FIG. 1 and the same are so designated in FIG. 3. In use, one merely removes cap 18 and then exposes the contents 20 of the casing 17 to the fluid under examination as explained in connection with FIG. 1.

The example shown in FIG. 4 is the same as in FIG. 3, except that the casing 21 has both ends open, but normally is closed by removable sealing caps 22, similar to cap 18 of FIG. 3, and similarly applied and removed. It has a sealing gasket, not shown, similar to gasket 19 of FIG. 3, and contents 23 similar to the contents of the envelopes disclosed in FIGS. 1-3.

The example shown in FIG. 5 employs an envelope 21 open at both ends, such as that shown in FIG. 4, and after its caps 22 are removed, conduits 24 and 25 such as rubber hose sections are attached to the open ends of the casing of envelope 21 and through these conduits, a fluid under pressure may be passed. The envelope 21 has contents 26 simiar to the contents of the other envelope, so that the fluid in passing through the envelope in intimate contact with the contents 26, if its carries any uncombined water, will cause a change in the color of the color agent that is confined in the casing by the fibrous mesh and the diluent powder of talc or clay. The solvent carbon tetrachloride breaks any emulsion that holds the water, so that the released traces of water can collect in globules and dissolve the color agent with resulting change in the color of such agent. Similarly, such tubes or conduits 24 and 25 may be passed over the ends of envelope 14 of FIG. 2 after the necks 15 have been broken off, and the fluid under examination passes through casing 14.

In all of the examples, and using the preferred materials, small amounts of anhydrous methylene blue powder (brown in color) are mixed with anhydrous talc or clays as a diluent, the amounts depending on the sensitivity required of the specific test. Small globs of glass or mineral wool which serve as a mesh are impregnated or filled with this mixture of methylene blue and diluent, and the fibers of the mesh, usually extruded fibers of glass or minerals or even plastics, hold the powder mixture in place. The mesh with the powders entrapped therein is then placed in one of the illustrated envelopes and the latter closed and sealed. The carbon tetrachloride can be added to the powder mixture before the envelopes are sealed, which is preferable, or added at once after the envelopes are opened for use, or to the fluid under examination. The envelopes can be closed as illustrated or stoppered, or closed in any desired manner.

If the water in the fluid being tested is not emulsified or dispersed, the use of the carbon tetrachloride is not necessary, but it does no harm and it does enhance the sensitivity because at least some of the trace of water in the fluid being tested may be in an emulsified or dispersed condition so that it does not readily collect in globules large enough to make a readily visible color showing by its action on the color agent. The metrylene blue in the envelope will turn a deep blue if there is at least 0.03 mg. of water in 500 cc. of the flluid being examined, although when the water content of the fluid being tested goes below 0.1 mg. of water in 500 cc., the globules may not appear on the surface of the mixture but may adhere to the sides of the envelope, in which case some agitation of the mixture may be used to disperse the methylene blue.

In one test of a jet fuel (Navy Grade JP–5, or heavy end aviation fuel, HEAF) saturated with water, various volumes of this fuel were dissolved in carbon tetrachloride, and methylene blue added. As little as 0.08 mg. of water, representing 0.000016% on the basis of a 500 gram sample, was indicated by the methylene blue. On a sample of turbine oil as little as 0.03 mg. of water for 500 grams of specimen was detected. The dry jet fuel when dissolved in the carbon tetrachloride gave no reaction with the methylene blue. Dry acetone and dry benzene give no reaction with methylene blue, and hence may be used in place of carbon tetrachloride. In fact, one may use any anhydrous solvent for the liquid under test which has no potential water in its molecular structure such as a labile OH group, and which is not a solvent for a water soluble dye.

It will be noted that in the use of the new kit, it is possible to obtain an approximation of the amount of water in a measured sample under examination. By bringing only a measured quantity of the fluid under examining into contact with the contents of the envelopes, the deepness of the color will give some indication of the proportion of the water present in the test specimen. In FIG. 5, by passing only a measured and known amount of a fluid under test, slowly through or into the envelope, the deepness of the color in the water that becomes visible through the use of a known quantity of the color agent will give an approximate indication of the proportion of water present in the fluid specimen under examination.

It will be understood that various changes in the steps, details, materials and arrangements of parts, which have been herein described and illustrated in order to explain the nature of the invention may be made by those skilled in the art within the principle and scope of the invention as expressed in the appended claims.

I claim:

1. The method of determining the presence of minute traces of water in a fluid which comprises establishing in a vial intimate contact between said fluid and a body of fibers that are inert to said fluid and have entrained therein small particles of an anhydrous, inert solid material carrying an anhydrous powder of a material which changes color materially when brought into contact with water and undergoes no change in color when in contact with said fluid when that fluid is free of released water, and an emulsion breaker.

2. The method according to claim 1 wherein said powder is methylene blue.

3. A device for use in determining the presence of minute traces of water in a fluid medium which comprises a closed, impervious vial containing, as contents therein, a penetrable mesh of compacted fibers that are inert to said medium largely filling said vial and having entrained therein and distributed throughout it small particles of an anhydrous solid material which is insoluble in water and in said fluid, and an anhydrous powder of a material which changes color materially when brought into contact with water and undergoes no material change in color when in contact with said fluid that is free of water, whereby when such a determination is to be made, said vial may be opened and its contents exposed to said fluid, whereupon any released water in said fluid to which said contents are exposed will cause a change in the color of said contents to indicate the presence of released water in said fluid, and a quantity of a water free, emulsion-breaking material forming a part of said contents.

4. The device according to claim 3, wherein said emulsion breaking material is carbon tetrachloride.

5. The device according to claim 3 wherein said color changing material is anhydrous methylene blue.

6. The device according to claim 3, wherein said vial is openable at both ends to enable passage of some of said fluid therethrough as a stream or more rapid entry of said fluid into said vial.

7. A device for use in determining the presence of minute traces of water in a fluid medium to be examined, which comprises a closed, impervous vial containing, as contents therein, a body of glass fibers having entrapped therein a mixture of anhydrous methylene blue powder and an anhydrous, diluent powder that is inert to water and said fluid, whereby when the vial is opened a small quantity of emulsion breaker added to the content, and its contents brought into contact with said fluid to be examined, any free and released water in said fluid will cause a change in color of said methylene blue and thus indicate the presence of water.

8. The device according to claim 7 wherein said diluent powder is an anhydrous mineral powder.

9. A device for use in determining the presence of minute traces of water in a fluid medium to be examined, which comprises a closed, impervious vial having confined therein a penetratable mass containing in its interior anhydrous methylene blue powder and anhydrous carbon tetrachloride, whereby when said vial is opened and its contents brought into contact with said fluid, said carbon tetrachloride will release any water held as an emulsion or suspension and any released and free water in said fluid which comes in contact with said contents will cause a change in color of said methylene blue, by which change the presence of water is indicated.

10. The device according to claim 9 wherein said vial is openable at both ends by which some of said fluid under examination may be passed as a confined stream through the vial to establish contact between said fluid and the contents of said envelope.

11. The method of determining the presence of minute traces of water in a fluid under examination which comprises passing a known quantity of said fluid as a confined stream through a mesh of fibers that are insoluble and inert in water and said fluid, which fibers have confined between them an inert, anhydrous filler powder mixed with an anhydrous color powder that materially changes color upon contact with free water but undergoes no change of color upon its contact with any of said fluid which is water free, and an emulsion breaker material.

12. The method according to claim 11 wherein said color powder is methylene blue.

13. The method of determining the presence of minute traces of water in a fluid under examination which comprises passing a known quantity of said fluid as a confined stream through a mesh of fibers that are insoluble and inert in water and said fluid, which fibers have confined between them anhydrous carbon tetrachloride and anhydrous methylene blue.

References Cited in the file of this patent

UNITED STATES PATENTS

| | | |
|---|---|---|
| 2,612,036 | Angona | Sept. 30, 1952 |
| 2,836,974 | Krause | June 3, 1958 |
| 2,844,025 | Joyce et al. | July 22, 1958 |
| 2,968,940 | Feldman | Jan. 24, 1961 |

FOREIGN PATENTS

| | | |
|---|---|---|
| 563,182 | Great Britain | Aug. 2, 1944 |

OTHER REFERENCES

Official and Tentative Methods of Analysis of the Association of Official Agricultural Chemists, 6th ed. (1945), published by the Association of Official Agricultural Chemists, Washington, D.C. Sec. 39.60(a). Pages 683, 684.

Determination of Minute Traces of Water by Use of Methylene Blue. By Florence Nesh. Analytical Chemistry, volume 27, No. 11. November 1955. Pages 1842–1843.